United States Patent
Pyun et al.

(10) Patent No.: US 10,763,950 B2
(45) Date of Patent: Sep. 1, 2020

(54) 5G IN-BUILDING RELAY SYSTEM AND 5G IN-BUILDING RELAY METHOD FOR SHARING RF CABLE IN BUILDING

(71) Applicant: KT CORPORATION, Gyeonggi-do (KR)

(72) Inventors: Sung-Yeop Pyun, Seoul (KR); Jong-Sik Lee, Seoul (KR); Won-Yeol Lee, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 0 days.

(21) Appl. No.: 16/315,243

(22) PCT Filed: Jul. 7, 2017

(86) PCT No.: PCT/KR2017/007318
§ 371 (c)(1),
(2) Date: Apr. 19, 2019

(87) PCT Pub. No.: WO2018/009035
PCT Pub. Date: Jan. 11, 2018

(65) Prior Publication Data
US 2019/0253129 A1    Aug. 15, 2019

(30) Foreign Application Priority Data
Jul. 7, 2016   (KR) .................. 10-2016-0086414

(51) Int. Cl.
*H04B 7/15* (2006.01)
*H04B 7/155* (2006.01)
(Continued)

(52) U.S. Cl.
CPC ............... *H04B 7/155* (2013.01); *H04B 3/36* (2013.01); *H04B 3/50* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,501,942 B1 * | 12/2002 | Weissman | ............ | H04B 7/0817 455/14 |
| 6,560,213 B1 * | 5/2003 | Izadpanah | ............. | H04W 84/14 370/278 |

(Continued)

FOREIGN PATENT DOCUMENTS

| | | |
|---|---|---|
| KR | 10-2002-0071070 A | 9/2002 |
| KR | 10-2004-0093464 A | 11/2004 |

(Continued)

*Primary Examiner* — Junpeng Chen
(74) *Attorney, Agent, or Firm* — IP Legal Services, LLC (57) ABSTRACT

Provided are a 5G in-building relay system and a 5G in-building relay method for sharing an RF cable to provide a 5G communication service in the building. The 5G in-building relay system includes: a 5G signal providing device for converting RF signals of a 5G into IF signals and providing the IF signals through a pre-built RF cable of the building; an MHU for receiving and transmitting the IF signals; a coupling device for combining the IF signals with radio signals other than the 5G received from an ROU pre-built in the building and providing the combined signals through the RF cable; a distribution device for receiving the combined signals and separating and distributing the IF signals of the 5G from the combined signals; and a DRU for converting the distributed IF signals into millimeter-wave RF signals and wirelessly transmitting the RF signals to a 5G terminal.

26 Claims, 6 Drawing Sheets

(51) Int. Cl.
*H04B 3/36* (2006.01)
*H04B 3/50* (2006.01)

(56) References Cited

U.S. PATENT DOCUMENTS

| | | |
|---|---|---|
| 9,119,127 B1 | 8/2015 | Henry et al. |
| 2005/0249245 A1 | 11/2005 | Hazani et al. |
| 2007/0173202 A1 | 7/2007 | Binder et al. |
| 2008/0146146 A1 | 6/2008 | Binder et al. |
| 2008/0280569 A1 | 11/2008 | Hazani et al. |
| 2011/0130163 A1 | 6/2011 | Saban et al. |
| 2011/0206088 A1 | 8/2011 | Binder et al. |
| 2011/0281530 A1 | 11/2011 | Hazani et al. |
| 2012/0236906 A1 | 9/2012 | Binder et al. |
| 2012/0293390 A1 | 11/2012 | Shoemaker et al. |
| 2013/0051404 A1 | 2/2013 | Binder et al. |
| 2013/0279417 A1 | 10/2013 | Binder et al. |
| 2014/0155054 A1 | 6/2014 | Henry et al. |
| 2015/0055547 A1 | 2/2015 | Licardie et al. |
| 2015/0304045 A1 | 10/2015 | Henry et al. |
| 2016/0261311 A1 | 9/2016 | Henry et al. |
| 2016/0278094 A1 | 9/2016 | Henry et al. |
| 2016/0323015 A1 | 11/2016 | Henry et al. |
| 2016/0380669 A1* | 12/2016 | Liu .................. H04B 1/525 375/219 |
| 2017/0117952 A1 | 4/2017 | Licardie et al. |
| 2017/0265196 A1 | 9/2017 | Henry et al. |
| 2017/0374666 A1 | 12/2017 | Henry et al. |
| 2018/0287667 A1 | 10/2018 | Henry et al. |

FOREIGN PATENT DOCUMENTS

| | | |
|---|---|---|
| KR | 10-0597785 B1 | 7/2006 |
| KR | 10-1413314 B1 | 7/2014 |
| KR | 10-2015-0029473 A | 3/2015 |
| KR | 10-2015-0059979 A | 6/2015 |
| KR | 10-2015-0127402 A | 11/2015 |
| KR | 10-1566304 B1 | 11/2015 |
| KR | 10-1583316 B1 | 1/2016 |
| WO | 02/071648 A1 | 9/2002 |
| WO | 2005/109845 A1 | 11/2005 |

\* cited by examiner

5G IN-BUILDING RELAY SYSTEM AND 5G IN-BUILDING RELAY METHOD FOR SHARING RF CABLE IN BUILDING

CROSS REFERENCE TO RELATED APPLICATIONS

This application is a National Stage Patent Application of PCT International Patent Application No. PCT/KR2017/007318 (filed on Jul. 7, 2017) under 35 U.S.C. § 371, which claims priority to Korean Patent Application No. 10-2016-0086414 (filed on Jul. 7, 2016), the teachings of which are incorporated herein in their entireties by reference.

TECHNICAL FIELD

The present disclosure relates to 5G in-building relay technology, and more particularly, to a 5G in-building relay system and method for providing a 5G service in a building by converting an RF signal to an IF signal for sharing of an RF cable in the building.

BACKGROUND ART

A 5G in-building relay service provides a millimeter-wave 5G service using broadband in 30~300 GHz ultra high frequency.

The typical in-building repeater solves a dead spot in a building and improves the communication quality (VoC). Further, the typical in-building repeater establishes wireless coverage by installing a Radio Frequency (RF) cable and an antenna in the building. Hereinafter, the problem of the typical in-building repeater will be described, considering an optical distribution repeater as a most commonly used typical in-building repeater.

Figure 1:
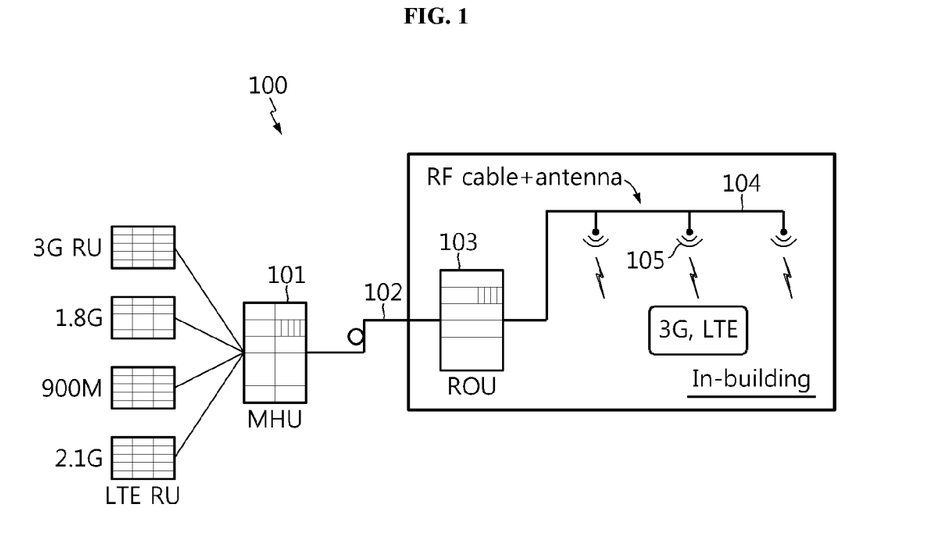
FIG. 1 is a diagram of an in-building repeater using an RF cable in a building according to the related art.

As the most commonly used typical in-building repeater, an optical distribution repeater 100 includes a Main Hub Unit (MHU) 101 and a Remote Optical Unit (ROU) 103, as shown in FIG. 1. The MHU 101 receives signal sources from radio stations and combines them and transmit the combined signals. The ROU 103 is installed in the building and receives a signal from the MUH 101 through an optical cable 102. The ROU 103 transmits a signal through an RF cable 104 in the building, and the transmitted signal is sent to a wireless terminal as a wireless RF signal through an antenna 105.

Because the typical LTE and 3G (WCDMA) services use the frequency range of 5 GHz or less, it is possible to transmit the corresponding RF signal and provide the service in the building through the RF cable 104. However, because a 5G service using a millimeter-wave uses the ultra-high frequency range, there are problems such as transmission distance restriction and performance degradation when a millimeter-wave is transmitted through the RF cable 104. Accordingly, it is impossible to provide a service using the typical in-building repeater 100.

DISCLOSURE

Technical Problem

The present disclosure is designed to solve the above-described problem, therefore the present disclosure is directed to providing a 5G in-building relay system and method for providing a 5G service in a building by converting a 5G RF signal to an IF signal, transmitting the converted IF signal through sharing of an RF cable in the building, and converting the IF signal transmitted through the RF cable to an RF signal.

Technical Solution

To achieve the above-described object, a 5G in-building relay system sharing an RF cable in a building according to an aspect of the present disclosure includes a 5G signal providing device which converts a 5G millimeter-wave Radio Frequency (RF) signal received from a radio station into an Intermediate Frequency (IF) signal, and provides the converted IF signal through an existing Radio Frequency (RF) cable of the building, a Main Hub Unit (MHU) which receives and transmits the converted IF signal, a coupling device which combines the received IF signal with other radio signal, but not 5G, received from an existing Remote Optic Unit (ROU) in the building, and provides the combined signal through the RF cable, a distribution device which receives the combined signal, and separates the 5G IF signal from the received signal and distributes the same, and a Distributed Remote Unit (DRU) which converts the distributed IF signal into a millimeter-wave RF signal, and wirelessly sends the converted RF signal to a 5G terminal.

The 5G signal providing device includes an RF processing unit to convert a downlink millimeter-wave RF signal received from the radio station into an IF signal and transmit the same to the MHU, and to convert an uplink IF signal received from the MHU into a millimeter-wave RF signal and transmit the same to the radio station.

The 5G signal providing device transmits a reference clock received from the radio station to the MHU.

The 5G signal providing device is incorporated into the radio station or the MHU.

The MHU transmits a downlink 5G IF signal received from the 5G signal providing device to the DRU through the coupling device and the distribution device connected to the RF cable, and transmits an uplink 5G IF signal received from the DRU through the distribution device and the coupling device to the 5G signal providing device.

The MHU is connected to multiple DRUs each including the coupling device, the distribution device and the DRU.

The MHU includes an IF processing unit which separates a downlink IF signal received from the 5G signal providing device and an uplink IF signal received from the DRU for each channel, selects an arbitrary channel according to traffic and interference in the building, and transmits the same, and an analog processing unit which combines the downlink IF signals received from the IF processing unit, transmits the combined IF signal to the DRU through the RF cable, separates the uplink IF signal received in combination from the multiple DRUs connected through the branches for each stream, and transmits the same to the IF processing unit.

The analog processing unit changes the frequency of the IF signal, in consideration of a frequency range and Intermodulation distortion (IMD) interference in communication of the ROU connected to the coupling device of each branch through the RF cable.

The analog processing unit transmits a reference clock received from the 5G signal providing device to the DRU.

The DRU converts a downlink IF signal received from the MHU through the distribution device into an RF signal, wirelessly sends the converted RF signal to the 5G terminal, converts an uplink RF signal wirelessly received from the 5G terminal into an IF signal, and transmits the converted IF signal to the MHU.

The DRU includes an analog processing unit which separates and outputs a downlink IF signal received from the MHU for each stream, and combines the uplink IF signals outputted for each stream and transmits the same to the MHU, and an RF processing unit which receives the outputted downlink IF signal, converts the outputted IF signal to an RF signal, wirelessly sends the same through an antenna, converts an uplink radio signal wirelessly received from the 5G terminal to an IF signal, and outputs the converted IF signal to the analog processing unit.

The analog processing unit changes the frequency of the IF signal, in consideration of frequency range and Intermodulation distortion (IMD) interference in communication of the ROU connected to the coupling device of each branch communicates through the RF cable.

The analog processing unit outputs transmission timing information extracted from the downlink or uplink IF signals, and outputs a reference clock received from the radio station through the 5G signal providing device, to the RF processing unit, and the RF processing unit provides a Time Division Duplex (TDD) or Frequency Division Duplex (FDD) based 5G service through the outputted transmission timing information and the outputted reference clock.

To achieve the above-described object, a 5G in-building relay method sharing an RF cable in a building according to another aspect of the present disclosure is a 5G in-building relay method for providing a downlink 5G service from a radio station to a 5G terminal, the 5G in-building relay method, including (a) a 5G signal providing step of converting, by a 5G signal providing device, a 5G millimeter-wave Radio Frequency (RF) signal received from a radio station to an Intermediate Frequency (IF) signal, and providing the converted IF signal through an existing Radio Frequency (RF) cable in a building, (b) a Main Hub Unit (MHU) communication step of receiving, by an MHU, the converted IF signal from the 5G signal providing device and transmitting the same, (c) a signal combination step of combining, by a coupling device, the IF signal received from the MHU with other radio signal, but not 5G, received from an existing Remote Optic Unit (ROU) in the building, and providing the combined signal through the RF cable, (d) a signal distributing step of receiving, by a distribution device, the combined signal from the coupling device, and separating the 5G IF signal from the received combined signal and distributing the same, and (e) a 5G terminal communication step of converting, by a DRU, the IF signal distributed from the distribution device to a millimeter-wave RF signal, and wirelessly sending the converted RF signal to a 5G terminal.

Advantageous Effects

The present disclosure may provide a 5G millimeter-wave service through sharing of a typical RF cable of an in-building repeater. Accordingly, there is no need to install a new cable supporting 5G requirements when establishing 5G coverage in a building, thereby significantly reducing the establishment cost.

MODE FOR CARRYING OUT THE INVENTION

These and other objects, features and advantages will be apparent through the following detailed description related to the accompanying drawings, and accordingly, those having ordinary skill in the technical field to which the present disclosure belongs will be able to easily practice the technical aspects of the present disclosure. Additionally, in describing the present disclosure, when it is deemed that a detailed description of relevant known technology renders the key subject matter of the present disclosure unnecessarily ambiguous, the detailed description is omitted herein. Hereinafter, a preferred embodiment of the present disclosure will be described in detail with reference to the accompanying drawings.

Figure 2:
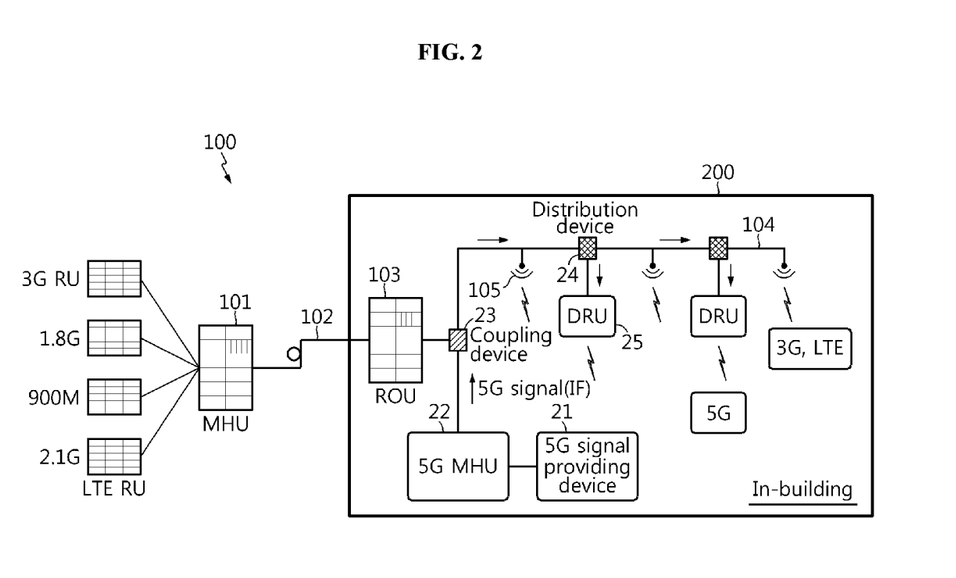
FIG. 2 is a diagram of a 5G in-building relay system sharing an RF cable in a building according to an embodiment of the present disclosure.

FIG. 2 is a diagram of a 5G in-building relay system 200 sharing a RF cable 104 in a building according to an embodiment of the present disclosure.

The 5G in-building relay system 200 according to an embodiment of the present disclosure includes a 5G signal providing device 21 to receive a 5G RF signal, convert it to an IF signal and provides it into the building, a 5G MHU 22 to receive the converted IF signal from the 5G signal providing device 21 and transmit it, a coupling device 23 to receive the IF signal from the 5G MHU 22 and combine it with other radio signal, except 5G signals, a distribution device 24 to receive the combined signal from the coupling device 23 and distribute the 5G IF signal, and a DRU 25 to receive the distributed IF signal from the distribution device 24, convert it to an RF signal and wirelessly sends it to a 5G terminal in the building.

The 5G in-building relay system 200 provides a millimeter-wave 5G communication service to 5G terminals in the building through sharing of the typical RF cable 104 of FIG. 1.

In the present disclosure, the 5G signal providing device 21 may be implemented as a computer device including a memory, a memory controller, at least one processor (CPU), a peripheral interface, an input/output (I/O) subsystem, a display device, an input device and a communication circuit as its components. These components communicate each other through at least one communication bus or signal line. These components may be implemented in hardware and software alone or in combination, including at least one signal processing and/or application specific integrated circuit.

The memory may include a high-speed random access memory, and at least one non-volatile memory such as a magnetic disk storage device and a flash memory device, or other non-volatile semiconductor memory device. Memory access from the other components, such as the processor and the peripheral interface, may be controlled by the memory controller. The memory stores data and programs for performing operations of the 5G in-building relay system 104.

The peripheral interface connects the input/output device to the processor and the memory. At least one processor executes various software programs and/or instruction sets stored in the memory to perform many functions and process data. In some embodiments, the software component has an operating system (OS), a graphic module (instruction set), and at least one program for performing operations of the present disclosure. For example, the OS may be an embedded OS such as Darwin, RTXC, LINUX, UNIX, OS X, WINDOWS or VxWorks, Android and iOS. Such an OS may include various software components and/or devices to control and manage general system tasks (for example, memory management, storage device control and power management) and promotes communication between various hardware and software components. The graphic module includes software components to produce and display graphics on the display device. The term "graphics" includes a text, a webpage, an icon (for example, a user interface target including a soft key), a digital image, a video and an animation without limitation, and includes all objects that can be displayed. In some embodiments, the peripheral interface, the processor and the memory controller may be implemented on a single chip. In some other embodiments, they may be implemented as separate chips.

The I/O subsystem provides an interface between an input/output device and the peripheral interface. Herein, the input/output device may be a display device and an input device. The display device may use liquid crystal display (LCD) technology or light emitting polymer display (LPD) technology, and the display device may include capacitive, resistive and infrared touch displays. The touch display provides an output interface and an input interface between the system and the user. The touch display displays a visible output to the user. The visible output may include a text, graphics and a video, and their combinations. All or part of the visible output may correspond to a user interface target. The touch display has a touch sensing surface to receive a user input. The processor is a processor configured to perform an operation related to the system and execute instructions, and for example, may control the reception and manipulation of input and output data between the system components using the instructions retrieved from the memory.

The communication circuit may include an Ethernet communication circuit and an radio frequency (RF) circuit. The Ethernet communication circuit performs a wired communication, and the RF circuit transmits and receives an electromagnetic wave. The RF circuit converts an electrical signal to an electromagnetic wave or vice versa, and communicates with a communication network, other mobile gateway and a communication device through the electromagnetic wave.

Additionally, the 5G MHU 22, the coupling device 23, the distribution device 24 and the DRU 25 may be implemented in the above-described computer device.

Here, the 5G signal providing device 21 converts an RF signal of millimeter-wave to an IF signal having intermediate frequency. The 5G MHU 22 transmits the IF signal converted by the 5G signal providing device 21 into the building through the coupling device 23. The coupling device 23 combines the 5G IF signal received from the 5G MHU 22 with other radio signal, except 5G signals, to generate a combined signal. The other radio signal, but not 5G signals, includes, for example, signals generated based on technologies related to provide the typical LTE and 3G (WCDMA) services described in FIG. 1. The distribution device 24 separates a 5G IF signal from the combined signal received from the coupling device 23 and distributes the separated IF signal. The DRU 25 converts the IF signal distributed from the distribution device 24 to a millimeter-wave RF signal and wirelessly sends the converted RF signal to the 5G terminal in the building in order to provide a 5G service.

In the signal conversion processing and communication process from the 5G signal providing device 21 to the 5G MHU 22, the coupling device 23, the distribution device 24 and the DRU 25, the typical RF cable 104 in the building is used as a communication line. Accordingly, it is possible to reduce a cost for installing a separate communication line for providing a 5G service in the building in accordance with at least one embodiment.

Figure 3:
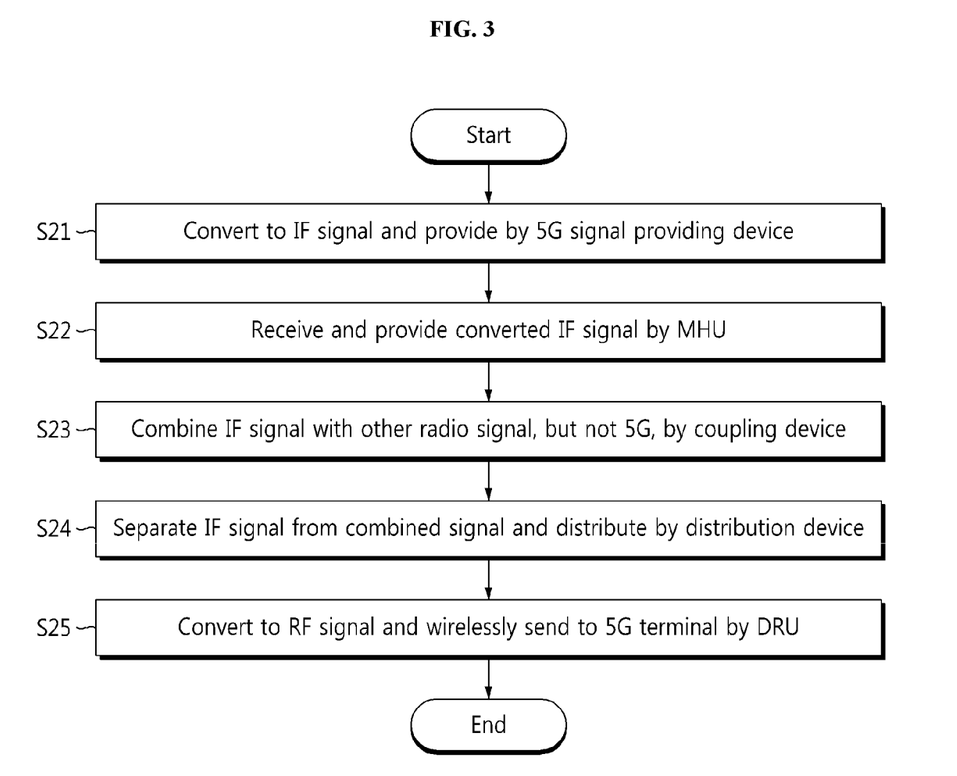
FIG. 3 is a flowchart of an in-building relay method according to an embodiment of the present disclosure.
Figure 4:
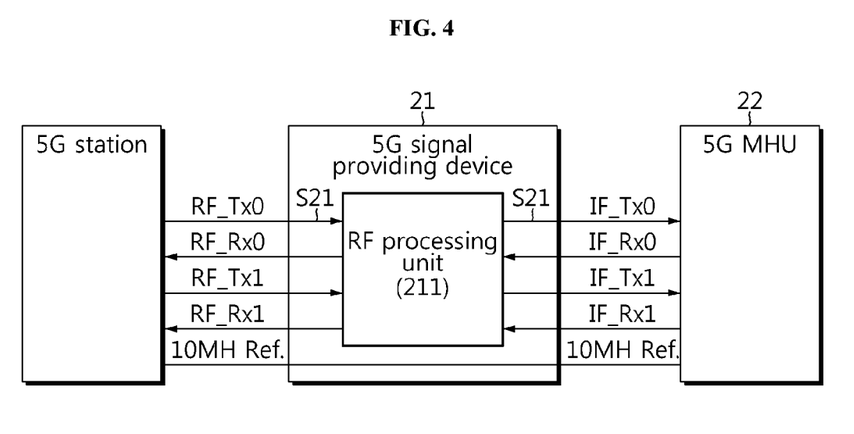
FIG. 4 is a diagram for showing an internal structure of a 5G signal providing device of FIG. 2 and describing operations thereof.
Figure 5:
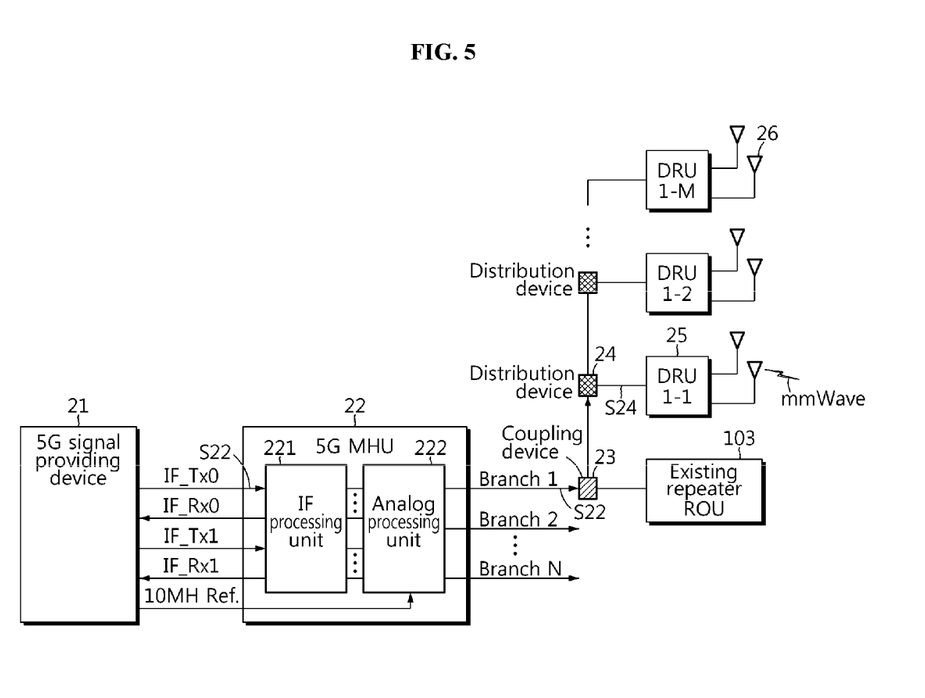
FIG. 5 is a diagram for showing an internal structure of shows an MHU of FIG. 2 and describing operations thereof.
Figure 6:
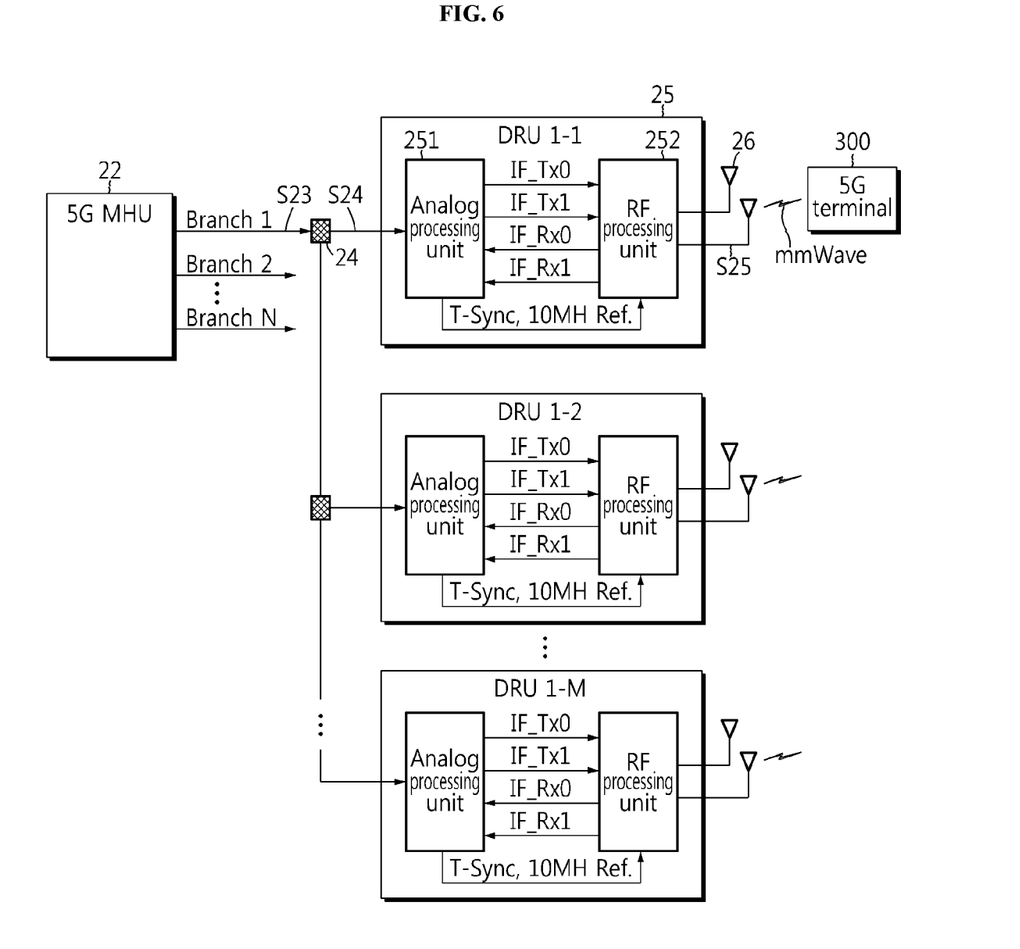
FIG. 6 is a diagram for showing an internal structure of a DRU of FIG. 2 and describing operations thereof.

FIG. 3 is a flowchart of an in-building relay method according to an embodiment of the present disclosure. FIG. 4 is a diagram for showing an internal structure of a 5G signal providing device of FIG. 2 and for describing operations thereof. FIG. 5 is a diagram for showing an internal structure of a MHU of FIG. 2 and for describing operations thereof. Additionally, FIG. 6 is a diagram for showing an internal structure of the DRU of FIG. 2 and for describing operations thereof. Hereinafter, the in-building relay method of FIG. 3 will be described in detail with reference to the internal structure of the 5G in-building relay system 200 shown in FIG. 4 to FIG. 6.

The 5G signal providing device 21 receives a 5G millimeter-wave RF signal from the radio station, converts the received RF signal to an IF signal, and provides the converted IF signal through the typical RF cable of the building (S21). Herein, the typical RF cable may be a RF cable produced and installed in the building prior to the introduction of 5G technology.

Describing the above-described step S21 with reference to FIG. 4, the 5G signal providing device 21 includes an RF processing unit 211. The RF processing unit 211 converts a downlink RF signal RF_Tx received from the (5G) radio station to an IF signal IF_Tx and transmits it to the 5G MHU 22. The conversion processing to IF signal may enable communication in the building using the converted IF signal through the RF cable 104 in the building. Additionally, describing uplink communication processing that is opposite to the downlink, the RF processing unit 211 converts an uplink IF signal IF_Rx received from the 5G MHU 22 to a millimeter-wave RF signal RF_Rx and wirelessly transmits it to the radio station.

Here, the 5G signal providing device 21 transmits a reference clock (10 MHz Ref.) received from the radio station to the 5G MHU 22. The 5G signal providing device 21 may be incorporated into the radio station or the 5G MHU 22 according to situations.

When the 5G MHU 22 receives the converted IF signal from the 5G signal providing device 21, the 5G MHU 22 provides the received IF signal to the coupling device 23 (S22).

Here, the 5G MHU 22 transmits the downlink IF signal IF_Tx received from the 5G signal device 21 to the DRU 25 through the coupling device 23 and the distribution device 24 connected by the RF cable 104. In the case of uplink, the 5G MHU 22 transmits the uplink IF signal IF_Rx received from the lower-level DRU 25 through the distribution device 24 and the coupling device 23 to the 5G signal providing device 21.

The 5G MHU 22 supports multiple branches and is connected to multiple DRUs 25 for each branch. That is, each branch includes the component unit of the coupling device 23, the distribution device 24 and the DRU 25.

Describing the above-described step S22 with reference to FIG. 5, the 5G MHU 22 includes an IF processing unit 221 and an analog processing unit 222.

The IF processing unit 221 may separate each of uplink and downlink wideband IF signals by the multiple channels, and the IF processing unit 221 may select and transmit it according to traffic and interference situations in the building. For example, the IF processing unit 221 separates the downlink 1 GHz wideband IF signal into ten 100 MHz channels. When traffic in the building is low or external interference is severe, the IF processing unit 221 selects only some of the tens channels and transmits it to the analog processing unit 222. Additionally, the IF processing unit 221 may select and transmit a data stream (stream0=IF_Tx0+IF_Rx0) according to traffic and interference situations in the building. That is, the stream may be selected by the unit of Tx+Rx pair.

The analog processing unit 222 combines downlink IF signals IF_Tx0+IF_Tx1, and transmits it to the DRU 25 through the RF cable 104. The analog processing unit 222 separates the combined uplink IF signal IF_Rx0+IF_Rx1 received from the multiple DRUs 25 connected to the multiple branches for each stream IF_Rx0, IF_Rx1, and transmits it to the IF processing unit 221.

Here, the analog processing unit 222 may change the frequency of the downlink IF signal in consideration of the frequency range and IMD interference that the repeater ROU 103 is using in the RF cable 104. When the frequency range of the IF signal provided by the 5G signal providing device 21 overlaps with the frequency range being used by the existing repeater 100, it is necessary to change the IF frequency. To avoid different IMD interferences that may occur due to the frequency combination being used by the existing repeater 100, it is necessary to change the IF frequency. Additionally, the analog processing unit 222 may transmit the reference clock (10 MHz Ref) received from the 5G signal providing device 21 to the DRU 25 through the RF cable 104.

When the coupling device 23 receives the converted 5G IF signal from the 5G MHU 22, the coupling device 23 combines the received IF signal with other radio signals, excepts 5G signals, received from the existing ROU 103, and provides the combined signal to the distribution device 24 (S23).

Subsequently, the distribution device 24 receive the combined signal of the radio signals from the coupling device 23, the distribution device 24 separates the 5G IF signal from the combined signal, and distributes the separated IF signal to the DRU 25 (S24).

Subsequently, when the DRU 25 receives the separated IF signal distributed from the distribution device 24, recovers the distributed IF signal to a millimeter-wave RF signal, and wirelessly sends the recovered RF signal to the 5G terminal in the building (S25). Additionally, by uplink processing, the DRU 25 converts the uplink millimeter-wave RF signal received from the 5G terminal to an IF signal and transmits it to the 5G MHU 22.

Describing the above-described step S25 with reference to FIG. 6, the DRU 25 includes an analog processing unit 251 and an RF processing unit 252.

The analog processing unit 251 separates the combined downlink IF signal IF_Tx0+IF_Tx1 received from the 5G MHU 22 into IF_Tx0, IF_Tx1 for each stream and transmits it to the RF processing unit 252. In the case of uplink processing, the analog processing unit 251 combines uplink IF signals IF_Rx0, IF_Rx1 received for each stream from the RF processing unit 252 into IF_Rx0+IF_Rx1 and transmits it to the 5G MHU 22. Here, the analog processing unit 251 may change the frequency of the uplink IF signal in consideration of the frequency range and IMD interference that the existing repeater 100 is using in the RF cable 104. When the frequency is changed in the analog processing unit 222 or analog processing unit 251, communication of the downlink and uplink IF signal between the MHU 22 and the DRU 25 uses the same IF frequency, and thus each of the MHU 22 and the DRU 25 need to change to the same frequency for downlink and uplink IF signal.

The RF processing unit 252 converts the downlink IF signal IF_Tx0, IF_Tx1 received from the IF processing unit 251 to a millimeter-wave RF signal RF_Tx0, RF_Tx1 and sends it to the 5G terminal 300 in the building through the antenna 26. In the case of uplink processing, the RF processing unit 252 converts the uplink millimeter-wave RF signal RF_Rx0, RF_Rx1 received from the 5G terminal 300 to an IF signal IF_Rx0, IF_Rx1 and transmits it to the 5G MHU 22.

Here, to provide a Time Division Duplex (TDD) based 5G service, the analog processing unit 251 may extract uplink or downlink transmission timing Time-Sync (T-Sync) from the downlink or uplink IF signals and transmit it to the RF processing unit 252.

Additionally, the analog processing unit 251 may recover the reference clock received from the radio station through 5G signal providing device 21, 5G MHU 22 and the RF cable 104, and transmit it to the RF processing unit 252.

The RF processing unit 252 may provide a 5G service using both TDD and Frequency Division Duplex (FDD) through the T-Sync and the reference clock received from the analog processing unit 251. For reference, whereas the T-Sync and the reference clock are required for TDD, the reference clock is required for FDD. The reference clock is used to synchronize the MHU 22 and the DRU 25 and allow them to perform the Tx/Rx operation at the same time, and T-sync is used to provide Tx/Rx timing in TDD. That is, in the case of a TDD system which performs a Tx operation during 750 ms and then an Rx operation during 250 ms in a 1 ms cycle frame, T-sync transmits '1' signal during 750 ms and '0' signal during the remaining 250 ms, and the MHU 22 and the DRU 25 perform a Tx operation during the corresponding '1' signal and an Rx operation during '0' signal.

While this specification contains many features, the features should not be construed as limiting the scope of the present disclosure or the appended claims. Additionally, certain features described in the context of separate embodiments herein can also be implemented in combination in a single embodiment. Conversely, various features described in the context of a single embodiment herein may be also implemented in various embodiments separately or in any suitable subcombination.

Although the operations are described in a specific order in the drawings, one should not understand that such operations are performed in the specific order as shown, or successively performed in a continuous order, or all the operations are performed to obtain a desired result. Multitasking or parallel processing may be advantageous in a particular environment. Moreover, it should be understood that all embodiments do not require the classification of various system components made in the above-described embodiment. The above-described program components and systems may be generally implemented as a single software product or multiple software product packages.

It should be noted that many substitutions, modifications, and changes may be made to the present disclosure by those having ordinary skill in the technical field to which the present disclosure belongs without departing from the technical aspects of the present disclosure, and the present disclosure is not limited by the above described embodiments and the accompanying drawings.

What is claimed is:

1. A fifth generation (5G) in-building relay system, comprising:
   a 5G signal providing device configured to convert a 5G millimeter-wave Radio Frequency (RF) signal received from a radio station into an 5G Intermediate Frequency (IF) signal and provide the converted 5G IF signal through an existing Radio Frequency (RF) cable of a building;
   a Main Hub Unit (MHU) configured to receive and transmit the converted 5G IF signal;
   a coupling device configured to combine the received 5G IF signal with other radio signal, other than 5G signals, received from an existing Remote Optic Unit (ROU) in the building, and provide the combined signal through the existing RF cable;
   a distribution device configured to receive the combined signal and separate the 5G IF signal from the received combined signal and distributes the 5G IF signal; and
   a Distributed Remote Unit (DRU) configured to convert the distributed 5G IF signal into a millimeter-wave RF signal and wirelessly send the converted millimeter-wave RF signal to a 5G terminal.

2. The 5G in-building relay system according to claim 1, wherein the 5G signal providing device comprises an RF processing unit configured to:
   convert a downlink 5G millimeter-wave RF signal received from the radio station into the 5G IF signal and transmit the 5G IF signal to the MHU; and
   convert an uplink 5G IF signal received from the MHU into the 5G millimeter-wave RF signal and transmit the 5G millimeter-wave RF signal to the radio station.

3. The 5G in-building relay system according to claim 1, wherein the 5G signal providing device transmits a reference clock received from the radio station to the MHU.

4. The 5G in-building relay system according to claim 1, wherein the 5G signal providing device is included in one of the radio station and the MHU.

5. The 5G in-building relay system according to claim 1, wherein the MHU transmits a downlink 5G IF signal received from the 5G signal providing device to the DRU through the coupling device and the distribution device connected to the existing RF cable, and the MHU transmits an uplink 5G IF signal received from the DRU through the distribution device and the coupling device to the 5G signal providing device.

6. The 5G in-building relay system according to claim 1, wherein the MHU is connected to multiple DRUs each including the coupling device, the distribution device and the DRU.

7. The 5G in-building relay system according to claim 1, wherein the MHU comprises:
   an IF processing unit configured to separate a downlink IF signal received from the 5G signal providing device or an uplink IF signal received from the DRU for each channel, select an arbitrary channel according to traffic and interference in the building, and transmit the separated downlink IF signal or the separated uplink IF signal; and
   an analog processing unit configured to combine the downlink IF signals received from the IF processing unit, transmit the combined downlink IF signal to the DRU through the existing RF cable, and the analog processing unit further configured to separate the uplink IF signal received from multiple DRUs connected through branches for each stream, and transmit the separated uplink IF signal to the IF processing unit.

8. The 5G in-building relay system according to claim 7, wherein the analog processing unit changes a frequency of the downlink IF signal in consideration of a frequency range and Intermodulation distortion (IMD) interference in communication of the ROU connected to the coupling device of each branch through the existing RF cable.

9. The 5G in-building relay system according to claim 7, wherein the analog processing unit transmits a reference clock received from the 5G signal providing device to the DRU.

10. The 5G in-building relay system according to claim 1, wherein the DRU converts a downlink IF signal received from the MHU through the distribution device into an RF signal, wirelessly sends the converted RF signal to the 5G terminal, and wherein the DRU converts an uplink RF signal wirelessly received from the 5G terminal into an IF signal, and transmits the converted IF signal to the MHU.

11. The 5G in-building relay system according to claim 1, wherein the DRU comprises:
   an analog processing unit configured to separate and output a downlink IF signal received from the MHU for each stream, and the analog processing unit further configured to combine an uplink IF signals outputted for each stream and transmit the combined uplink IF signal to the MHU; and
   an RF processing unit configured to receive the outputted downlink IF signal, convert the outputted download IF signal to an RF signal, wirelessly send the converted RF signal through an antenna, and the RF processing unit further configured to convert an uplink RF signal wirelessly received from the 5G terminal to an IF signal, and output the converted IF signal to the analog processing unit.

12. The 5G in-building relay system according to claim 11, wherein the analog processing unit changes a frequency of the downlink IF signal in consideration of frequency range and Intermodulation distortion (IMD) interference in communication of the ROU connected to the coupling device of each branch communicates through the existing RF cable.

13. The 5G in-building relay system according to claim 11, wherein the analog processing unit outputs transmission timing information extracted from the downlink or uplink IF signals, and outputs a reference clock received from the radio station through the 5G signal providing device to the RF processing unit, and
   the RF processing unit provides a Time Division Duplex (TDD) or a Frequency Division Duplex (FDD) based 5G service through the outputted transmission timing information and the outputted reference clock.

14. A fifth generation (5G) in-building relay method for providing a downlink 5G service from a radio station to a 5G terminal, the 5G in-building relay method comprising:
   (a) a 5G signal providing step of converting, by a 5G signal providing device, a 5G millimeter-wave Radio Frequency (RF) signal received from a radio station to a 5G Intermediate Frequency (IF) signal, and providing the converted 5G IF signal through an existing Radio Frequency (RF) cable in a building;
   (b) a Main Hub Unit (MHU) communication step of receiving, by an MHU, the converted 5G IF signal from the 5G signal providing device and transmitting the converted 5G IF signal;
   (c) a signal combination step of combining, by a coupling device, the converted 5G IF signal received from the MHU with other radio signal, other than 5G signals, received from an existing Remote Optic Unit (ROU) in the building, and providing the combined signal through the existing RF cable;

(d) a signal distributing step of receiving, by a distribution device, the combined signal from the coupling device, and separating the 5G IF signal from the received combined IF signal and distributing the signal; and (e) a 5G terminal communication step of converting, by a Distributed Remote Unit (DRU), the distributed 5G IF signal distributed from the distribution device to a millimeter-wave RF signal, and wirelessly sending the converted millimeter-wave RF signal to a 5G terminal.

15. The 5G in-building relay method according to claim 14, wherein the step (a) further comprises:
converting, by the 5G signal providing device, a downlink 5G millimeter-wave RF signal received from the radio station to the 5G IF signal and transmitting the 5G IF signal to the MHU; and
converting an uplink 5G IF signal received from the MHU to the 5G millimeter-wave RF signal and wirelessly sending the 5G millimeter-wave RF signal to the radio station.

16. The 5G in-building relay method according to claim 14, wherein step (a) further comprises:
transmitting, by the 5G signal providing device, a reference clock received from the radio station to the MHU.

17. The 5G in-building relay method according to claim 14, wherein the 5G signal providing device is included in one of the radio station and the MHU.

18. The 5G in-building relay method according to claim 14, wherein step (b) further comprises:
transmitting, by the MHU, a downlink 5G IF signal received from the 5G signal providing device to the DRU through the coupling device and the distribution device connected to the existing RF cable; and
transmitting an uplink 5G IF signal received from the DRU through the distribution device and the coupling device to the 5G signal providing device.

19. The 5G in-building relay method according to claim 14, wherein step (b) further comprises performing communication, by the MHU, in connection to multiple DRUs each including the coupling device, the distribution device and the DRU.

20. The 5G in-building relay method according to claim 14, wherein step (b) further comprises:
an IF processing step of separating, by an IF processing unit of the MHU, a downlink IF signal received from the 5G signal providing device or an uplink IF signal from the DRU for each channel, selecting an arbitrary channel according to traffic and interference in the building, and transmitting the separated downlink IF signal or the separated uplink IF signal; and
an analog processing step of combining, by an analog processing unit of the MHU, the received downlink IF signal, transmitting the combined downlink IF signal to the DRU through the existing RF cable, and the analog processing step further includes separating the uplink IF signal received from multiple DRUs connected through branches for each stream, and transmitting the separated uplink IF signal to the IF processing unit.

21. The 5G in-building relay method according to claim 20, wherein the analog processing step comprises changing a frequency of the downlink IF signal in consideration of frequency range and Intermodulation distortion (IMD) interference in communication of the ROU connected to the coupling device of each branch through the existing RF cable.

22. The 5G in-building relay method according to claim 20, wherein the analog processing step further comprises transmitting a reference clock received from the 5G signal providing device to the DRU.

23. The 5G in-building relay method according to claim 14, wherein step (e) further comprises:
converting, by the DRU, from the MHU, a downlink IF signal received through the distribution device to an RF signal, and wirelessly sending the converted RF signal to the 5G terminal; and
converting, by the DRU, an uplink RF signal wirelessly received from the 5G terminal to an IF signal, and transmitting the converted IF signal to the MHU.

24. The 5G in-building relay method according to claim 14, wherein step (e) further comprises:
an analog processing step of separating and outputting, by an analog processing unit of the DRU, a downlink IF signal received from the MHU for each stream, and combining an uplink IF signal outputted for each stream and transmitting the combined uplink IF signal to the MHU; and
an RF processing step of receiving, by an RF processing unit of the DRU, the downlink IF signal outputted from the analog processing unit, converting the outputted downlink IF signal to an RF signal and wirelessly sending the converted RF signal through an antenna, converting an uplink RF signal wirelessly received from the 5G terminal to an IF signal, and outputting the converted IF signal to the analog processing unit.

25. The 5G in-building relay method according to claim 24, wherein the analog processing step comprises changing, by the analog processing unit, a frequency of the downlink IF signal in consideration of a frequency range and Intermodulation distortion (IMD) interference in communication of the ROU connected to the coupling device of each branch through the existing RF cable.

26. The 5G in-building relay method according to claim 24, wherein the analog processing step comprises outputting, by the analog processing unit, transmission timing information extracted from the downlink or uplink IF signals, and outputting a reference clock received from the radio station through the 5G signal providing device to the RF processing unit; and
the RF processing unit provides a Time Division Duplex (TDD) or a Frequency Division Duplex (FDD) based 5G service through the outputted transmission timing information and the outputted reference clock.

\* \* \* \* \*